United States Patent [19]

Maus

[11] Patent Number: 4,484,474

[45] Date of Patent: Nov. 27, 1984

[54] UNBALANCE MEASUREMENT DEVICE FOR DETERMINATION OF UNBALANCE ACCORDING TO POSITION AND MAGNITUDE

[75] Inventor: Otfrid Maus, Darmstadt, Fed. Rep. of Germany

[73] Assignee: Schenck-Auto-Service-Geräte GmbH, Fed. Rep. of Germany

[21] Appl. No.: 512,975

[22] Filed: Jul. 12, 1983

[30] Foreign Application Priority Data

Jul. 28, 1982 [EP] European Pat. Off. ........ 82106805.3

[51] Int. Cl.³ .................... G01M 1/08; G01M 1/22
[52] U.S. Cl. ..................................................... 73/462
[58] Field of Search ......................................... 73/462

[56] References Cited

U.S. PATENT DOCUMENTS 3,478,602 11/1969 Tatum ................................ 73/462
4,250,555 2/1981 Mitchell et al. ................... 73/462

FOREIGN PATENT DOCUMENTS 729901 5/1955 United Kingdom ................ 73/462
2041538 1/1980 United Kingdom .

*Primary Examiner*—James J. Gill
*Attorney, Agent, or Firm*—Connolly and Hutz

[57] ABSTRACT

An unbalance measurement device is provided for a balancing machine for determining the unbalance of a rotor according to position and magnitude. The balancing machine has a drive motor, transducers, a spindle supporting the rotor to be balanced, and an increment disc fixed to the spindle. Filter circuitry for analog signals is provided for the purpose of reducing extraneous signals by means of a filter whose mid-frequency is controlled by a high control frequency. Due to this filtering, changes in the rotational frequency of the rotor to be balanced do not influence the determination of the position of the unbalance. In addition, in the case of correction in several planes, interference of the measurement in one plane caused by the preceding measurement in the other plane is prevented.

1 Claim, 2 Drawing Figures

UNBALANCE MEASUREMENT DEVICE FOR DETERMINATION OF UNBALANCE ACCORDING TO POSITION AND MAGNITUDE

BACKGROUND OF THE INVENTION

The present invention concerns an unbalance measurement device for determining the unbalance of a rotor according to position and magnitude, and more particularly to an unbalance measurement device for a balancing machine having a drive motor, transducers, a spindle supporting the rotor to be balanced, and an increment disc fixed to the spindle, the measurement device including analog filter circuitry for analog signals to reduce extraneous vibrations by means of controlling its filter mid-frequency by a high control frequency.

In all balancing machines it is necessary to eliminate extraneous vibrations generated by the bearings of the body to be balanced, the drive of the body to be balanced, or by air vibrations of the body itself, all of which influence the indication for position and/or amount of unbalance. For this purpose, the use of electrical filters has gained acceptance besides multiplying measuring systems, mainly with simpler machines, e.g. also for wheel balancing machines. For this purpose, band filters, high-pass filters, or low-pass filters are used.

However, all circuits of this nature have the disadvantage that already at minor deviations in the balancing speed from the predetermined mid-frequency of the filter device, significant phase errors of the transferred measurement signals will occur. Since unbalance measurement devices on balancing machines should indicate not only the magnitude of the unbalance but also the position of the unbalance on the body to be balanced in one or several planes, each error in the phase transmission has the effect of an error to the correction of the unbalance on the body to be balanced.

Electrical filters can be designed with varying filter selectivity Q, whereby unfortunately those filters which have the best selection effect also have the greatest change in phase response. If an electrical filter of high selectivity Q is used in unbalance measurement devices for balancing machines, care must be taken that the drive motor very precisely maintains the predetermined test speed of the rotational body. Speed deviations will thus cause major phase errors, particularly with electrical filters of high filter selectivity. Accordingly, there is currently an effort to reach a compromise between filter selectivity and phase error in order to be able to permit insignificant speed fluctuations within the range of the measurement speed without obtaining too great a phase error, which would cause an imperfect correction of the unbalance.

It would be obvious to apply "phase locked loops" (PLL) to the balancing speed for purposes of auxiliary control of the filters. However, since the phase itself is utilized as a control means in such control circuits, "PLL filter followers" will show phase errors. The magnitude of these errors depends on the deviation of the mid-frequency of the filter from the signal frequency. Signal frequency is understood to mean, in this case, the rotation frequency which usually changes from revolution to revolution of the body to be balanced. Such a circuit arrangement will by necessity generate a phase error, since the control circuit needs a value for the phase error in order to control the mid-frequency of the filter whereby the phase error does not reach a value of zero. Thus, this device is not appropriate for representing a value of an angle of unbalance which is free of phase errors.

UK Patent Application No. 20 41 538 also discloses a device for the subsequent compensation of these phase errors by means of complicated circuitry. According to this publication, the phase error is artifically determined by means of a special device and then added, by means of a microprocessor computer circuit as correction to the measured angle value, which is per se incorrect.

SUMMARY OF THE INVENTION

Against this background, the purpose of the present invention is to represent an angle measurement free of phase errors for the magnitude of the unbalance, which representation, particularly for a multiplane correction, is so precise that the corrected magnitude of unbalance in one plane does not influence the determination and the correction of the unbalance in the other correction plane.

According to the invention, this problem is solved in that a specific control input of the filter circuitry with switched capacitors for analog signals per revolution of the increment disc is activated with pulses from each increment of the increment disc. Thus, even with variable rotational frequency of the rotor to be balanced, the filter mid-frequency is constantly controlled with a very high control frequency and synchronized to the rotational frequency. Consequently, the phase errors which will by necessity exist in other type of tracking filters no longer occur, and even with varying rotational frequency, there will always be a precisely reproducible signal for the magnitude of the unbalance. Thus the unbalance measurement device obtains precise information concerning the unbalance to be eliminated on the body as well as information concerning the exact angle position of the unbalance in relation to a reference point on the body.

Due to the fact that the measurement of the magnitude of unbalance is no longer affected with phase errors in one plane, determination of the unbalance according to position and magnitude in the second correction plane will not cause an additional phase error, which could be transferred into the second plane by a phase error from the first plane.

BRIEF DESCRIPTION OF THE DRAWING

Novel features and advantages of the present invention in addition to those mentioned above will become apparent to those skilled in the art from a reading of the following detailed description in conjunction with the accompanying drawings wherein similar reference characters refer to similar parts and in which.

DETAILED DESCRIPTION OF THE INVENTION

Figure 1:
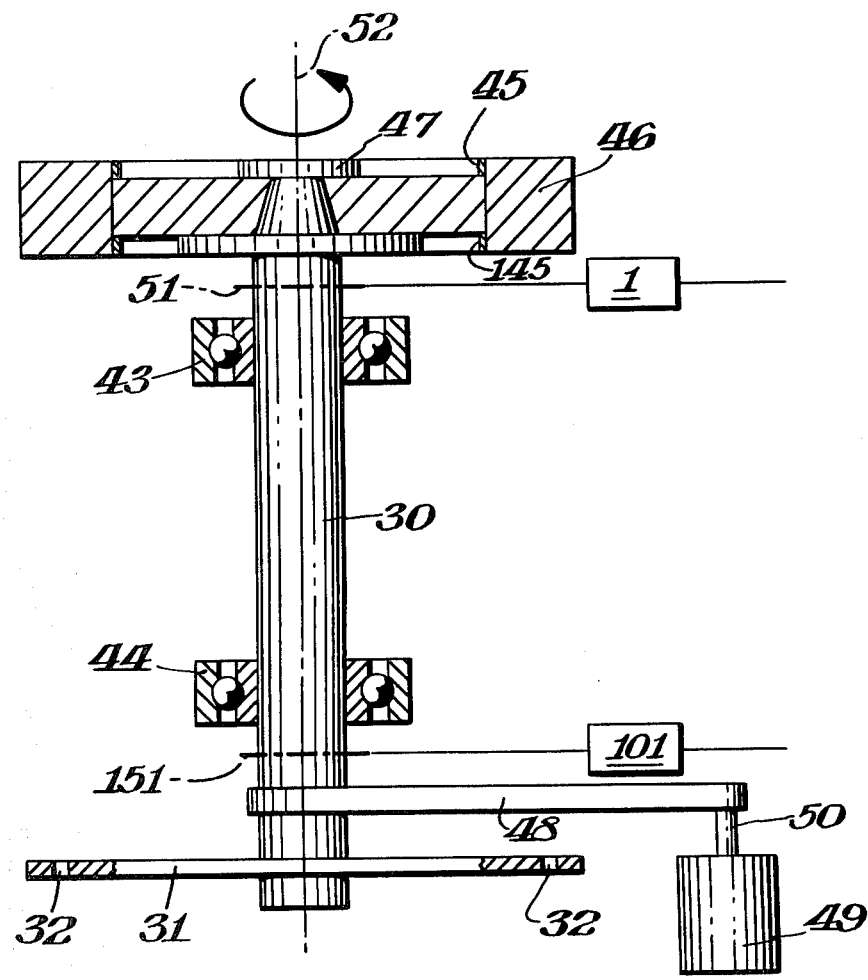
FIG. 1 is a schematic view only of the concerned parts of a balancing machine.

Referring in more particularity to the drawing, FIG. 1 illustrates a spindle 30 connected to a drive motor 49 via a motor shaft 50 and a belt drive 48. At one end, the spindle 30 has an increment disc 31 which is provided with equally spaced apart increments 32 in the form of holes. In the simplest case, the increments are simply borings which are arranged in the area of the edge of the increment disc 31 and to which reference is made in order to determine the rotation and the rotation frequency of the spindle. The number of increments 32 at the circumference of the increment disc 31 is arbitrary. Alternatively, instead of holes for example, a raised point may be provided as a reference mark for each degree on the increment disc 31. In the sensing of such an incremental arrangement, 360 impulses per revolution of the increment disc would be transmitted. It is also possible to adjust the number of the increments to binary numbers.

At the portion of the spindle 30 which is supported by bearings 43,44 opposite from the disc 31, an adapter 47 is provided to fix the rotor 46 to be balanced. The rotor 46 has a first correction plane 45 and a second correction plane 145, in which the unbalance measured for each plane can be corrected independently of one another according to position and magnitude by adding or removing material.

In order to determine the unbalance for the individual planes according to position and magnitude, transducers 1,101 are arranged in known state of the art to measure the vibrations caused by the rotor 46 at first and second measurement planes 51, 151 disposed perpendicular to the longitudinal axis 52 of the spindle 30, as shown in FIG. 1. The signals received by the transducer 1 for the first measurement plane 51 represent, after processing, the unbalance to be eliminated in the first correction plane 45 according to position and magnitude, while those signals received by the transducer 101 represent after processing the unbalance to be eliminated from the second correction plane 145 according to position and magnitude.

Figure 2:
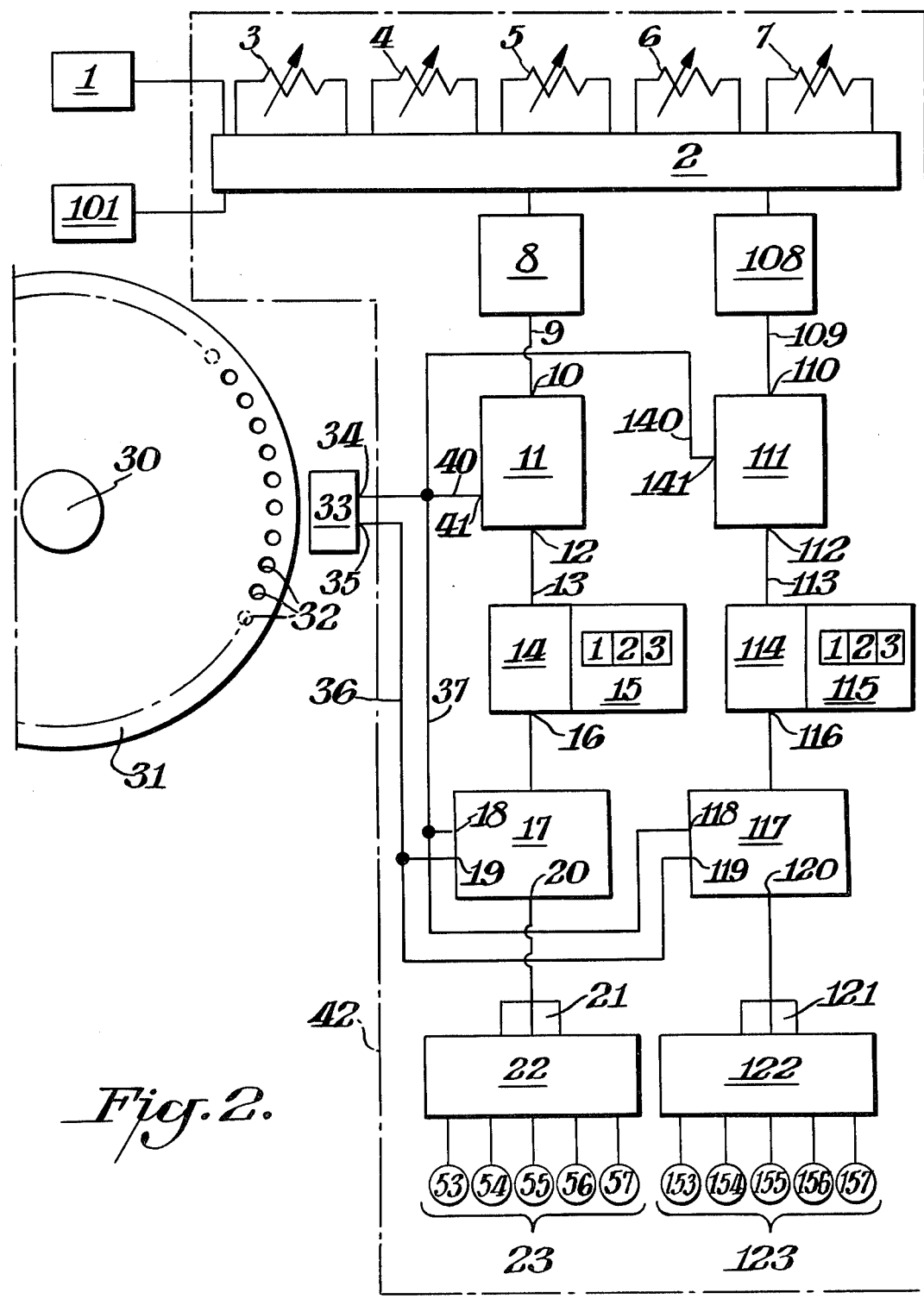
FIG. 2 is a diagrammatic view of an electrical circuit arrangement in an unbalance measurement device, according to the present invention.

FIG. 2 diagrammatically illustrates the unbalance measurement device according to the invention, which is generally accommodated in a housing 42. The signals transmitted from the transducer 1 for the first measurement plane 51 and those from the transducer 101 for the second measurement plane 151 are separately connected to the plane separation unit 2. The plane separation unit 2 has a variable resistor 3, on which the distance between the first measuring plane 51 and the first correction plane 45 is set. Further, the circuitry 2 has a variable resistor 4, on which the distance between the two correction planes 45 and 145 is set. In addition, a variable resistor 5 is set to the distance between the second correction plane and the second measurement plane, and a first radius adjuster in the form of a variable resistor 6 is set to the correction radius of the first correction plane 45. A second radius adjuster in the form of a variable resistor 7 is set to the correction radius for the second correction plane 145. By means of these settings, the signals from the transducers 1 and 101 in the plane separation unit are electrically combined to represent the unbalances in the correction planes 45, 145 and subsequently fed for the first correction plane 45 to a circuit 8 for elimination of the frequency dependency of the unbalance magnitude signal from the balancing speed, and for the second correction plane 145 to an additional circuit 108 for elimination of the frequency dependency of the unbalance magnitude signal of the balancing speed as well.

The electrical signals processed in this manner are fed via connection lines 9 and 109, respectively, to the analog inputs 10, 110 of analog filters 11 and 111, respectively. These analog filters 11 and 111, respectively, are fed via control inputs 41 and 141, respectively, of a sensor device 33 for simultaneous sensing two pulse trains generated by at least two increments 32 between which there is a displacement of half a division unit. The sensor device 33 senses the increments 32 on the increment disc 31 when the disc rotates. Due to the simultaneous sensing of at least two increments with one half division unit's displacement in relation to one another, there will be each a pulse train at each output 34 and 35 of the sensor device 33, which corresponds to the increment sequence with one half division unit displacement against each other. The first impulse sequence from output 34 is fed to the control inputs 41 and 141 of the analog filter 11, 111, via feed lines 40 and 140. The pulse train controls the automatic synchronization of the mid-frequency of the filters 11 and 111 in accordance with the momentary rotational frequency of the body 46 connected to the spindle 30 by means of a high control frequency which is a multiple of the rotational frequency. At the signal outputs 12 and 112 of the analog filters, the signals are filtered exactly to the rotational frequency of the body 46, and these signals are fed via lines 13 and 113 to rectifiers 14 and 114 with zero crossing detectors. Indicator devices 15 and 115 for the magnitude of the unbalance are connected to these rectifier controls 14 and 114. The magnitude of the unbalance is shown in these indicator devices 15 and 115.

The sinus voltage coming via the lines 13, 113 out of the switched capacitor filters 11, 111 are at the same time utilized via outputs 16 and 116, from the rectifier with zero crossing detector, for resetting of dedicated forwards/reverse ring counters 17 and 117. These ring counters are reset during the zero passage of the sinus signal, i.e. when the point with an unbalance passes the oscillation transducer 1 for one plane or the transducer 101 for the other plane. Thereby, the impulses counted via inputs 18 and 118 of the forwards/reverse counters 17 and 117 and coming from the sensing device 33 via its output 34 and the feed line 37 are reset to the counter status "Zero". Thus, during the measurement process, the impulses from the sensor device coming via the inputs 18 and 118 are counted for each revolution of the rotor 46 to be balanced, and subsequently reset. If the measurement process is completed, no unbalance vibrations are transmitted from the transducers 1 and 101 due to the fact that the machine is turned off, and consequently, there will also be no resetting of the forwards/reverse ring counters 17 and 117. Thereby, the angle position of the unbalance is equal to the zero position of the ring counters 17 and 117.

After the machine is turned off and turned into the angle position, the pertinent impulses of an increment sequence with one half division unit displacement are fed through the output 35 via a line 36 and inputs 19 and 119, to the forwards/reverse ring counters 17, 117. Thereby, angle information is fed from the outputs 20 and 120 of the forwards/reverse ring counters 17 and 117 to decoding controls 21 and 121 which, via indicator drives 22 and 122 affect the unbalance angle indications 23 and 123, shown as light diodes in the execution example. Five light diodes, 53, 54, 55, 56, 57, and 153, 154, 155, 156, 157 are provided for each unbalance angle indicator 23, 123, which will then show the correct indexing position of the rotor 46 to be balanced, when the center light diodes 55 and 155 light up at the zero value. In this case, the rotor 46 to be balanced is standing either in front of a processing machine or in a well defined position for the correction to be executed. In this way, the ring counters 17 and 117 retain the unbalance location, independent if the rotor 46 is turned or at standstill. It might be repeated that the unbalance indicators 23 and 123 can also accommodate indicator elements other than the light diodes described in the execution example and that the unbalance angle indicator 23 is used for the first correction plane 45, while the unbalance angle indicator 123 is intended for the second correction plane 145.

What is claimed is:

1. An unbalance measuring device for determining the unbalance of a rotor according to position and magnitude for a balancing machine having a drive motor, transducers, a spindle supporting the rotor to be balanced, an increment disc fixed to the spindle, a filter control for analog signals for suppressing extraneous signals by means of frequency control with a high control frequency, characterized in that a specific control input of the filter with switched capacitors for analog signals is activated by impulses from each increment of the increment disc for each revolution of the increment disc.

* * * * *